United States Patent

Yamamura et al.

Patent Number: 5,800,637
Date of Patent: Sep. 1, 1998

[54] ROLLING BEARING WITH LONG SERVICE LIFE AND HIGH WEAR RESISTANCE

[75] Inventors: Kenji Yamamura; Shuji Wada, both of Kanagawa, Japan

[73] Assignee: NSK Ltd., Tokyo, Japan

[21] Appl. No.: 857,061

[22] Filed: May 15, 1997

Related U.S. Application Data

[63] Continuation of Ser. No. 504,781, Jul. 19, 1995, abandoned.

[30] Foreign Application Priority Data

Jul. 19, 1994 [JP] Japan ............... 6-166735

[51] Int. Cl.$^6$ .................. C23C 8/22; F16C 33/62
[52] U.S. Cl. ................... 148/318; 384/492; 384/912; 428/469; 428/698
[58] Field of Search ................ 148/318; 428/469, 428/698; 384/492, 912

[56] References Cited

U.S. PATENT DOCUMENTS

| | | | |
|---|---|---|---|
| 5,030,017 | 7/1991 | Murakami et al. | 384/492 |
| 5,084,116 | 1/1992 | Mitamura | 384/492 |
| 5,085,733 | 2/1992 | Mitamura | 148/319 |
| 5,122,000 | 6/1992 | Matsumoto et al. | 384/492 |
| 5,338,377 | 8/1994 | Mitamura et al. | 148/318 |
| 5,352,303 | 10/1994 | Murakami et al. | 148/318 |
| 5,427,457 | 6/1995 | Furumura et al. | 384/450 |

FOREIGN PATENT DOCUMENTS 2235212  2/1991  United Kingdom ........... F16C 33/30

*Primary Examiner*—Archene Turner
*Attorney, Agent, or Firm*—Sughrue, Mion, Zinn, Macpeak & Seas, PLLC

[57] ABSTRACT

In a rolling bearing in which at least one member of an inner race, outer race and rolling elements is made of an alloy steel containing 0.2 to 1.0 wt % of C, 3.0 to 14.0 wt % of Cr and 0.8 to 3.0 wt % of V, the balance being Fe, the member being carburized or carbonitrided, followed by hardening and tempering to secure that the surface carbon concentration C% and the concentrations Cr%+V% of Cr and V satisfy a relationship of C% ≤ 0.13 (Cr%+V%)+1.10 and that carbides existing on a surface of the member have an area fraction of 15 to 50%, the rolling bearing has an extending service life even if it is used under lubrication in the presence of foreign matter and exhibits superior wear resistance to be hard to wear even if there occurs a breakage of oil film.

2 Claims, 4 Drawing Sheets

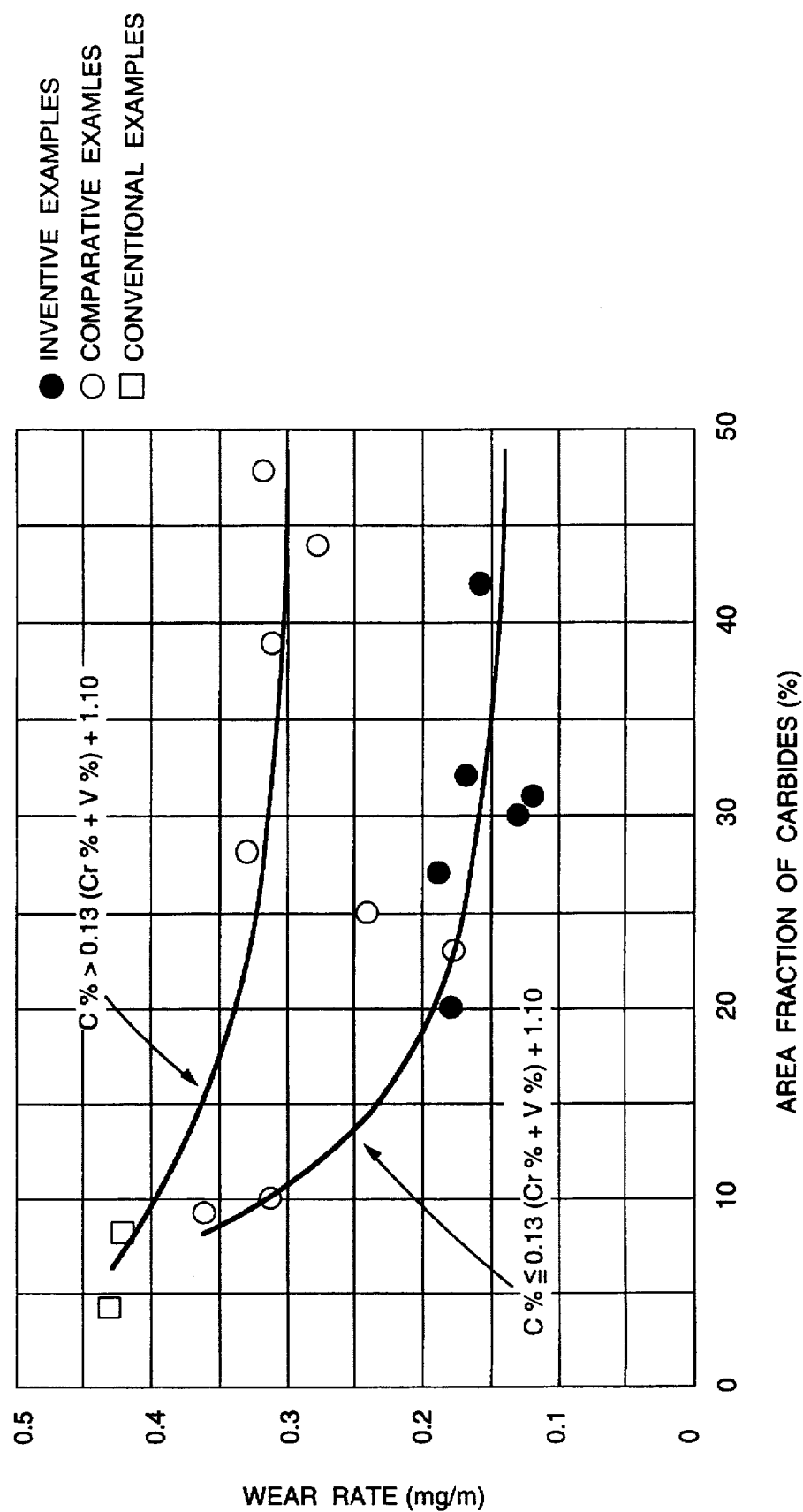

ROLLING BEARING WITH LONG SERVICE LIFE AND HIGH WEAR RESISTANCE

This is a Continuation of application Ser. No. 08/504,781 filed Jul. 19, 1995, now abandoned.

BACKGROUND OF THE INVENTION

The present invention relates to a rolling bearing for use in vehicles, agricultural machines, construction machines, steel making machines or the like. More specifically, the present invention relates to a rolling bearing for applications in which long service life and high wear resistance are required.

Rolling bearings are used under extremely severe conditions such that they are subjected to repeated shearing stress under high contact pressure. In order to withstand the applied shearing stress to thereby secure the necessary rolling fatigue life, conventional rolling bearings have been made of a high-carbon chromium bearing steel (SUJ 2), which is hardened and tempered to provide the hardness of $H_RC$ 58 to 64.

Case hardening steels (e.g. SCR 420, SCM 420, SAE 4320H, and the like) have also been used in rolling bearings. To secure the required service life, those steels are carburized or carbonitrided, followed by hardening and tempering so as to have the surface hardness of HRC 58 to 64 and the core hardness of $H_RC$ 30 to 48.

Recently, since vehicles with higher speed performance, lighter weight and better fuel economy, as well as steel making facilities with minimum maintenance are desired, the conditions for the use of bearings has become extremely severe. Under the circumstances, several problems have surfaced, such as the flaking of the bearing surface due to the damage caused by foreign matter, contamination, debris and the like which enter with a lubricant, progressive wear due to insufficient lubrication, and the like. On the other hand, there is an increasing demand for extending the service life of bearings under severe conditions.

To deal with this situation, for example, Unexamined Japanese Patent Publication No. Hei. 2-277764 proposed a method in which a high chromium steel is carburized or carbonitrided to precipitate fine-grained carbides in a bearing surface layer and the amount of retained austenite is limited in an appropriate range to assure a longer life under lubrication in the presence of foreign matter. This method, however, has not given entire consideration to the wear due to insufficient lubrication.

SUMMARY OF THE INVENTION

The present invention aims at providing a rolling bearing that not only has an extended service life under lubrication in the presence of foreign matter but also exhibits superior wear resistance.

The present invention can be attained by providing a rolling bearing with an inner race, an outer race and a plurality of rolling elements, in which at least one member of the inner race, the outer race and the rolling elements is made of an alloy steel containing: 0.2 to 1.0 wt % of C; 3.0 to 14.0 wt % of Cr; 0.8 to 3.0 wt % of V; at most 3.0 wt % of Mo; and the balance being Fe, the member being carburized or carbonitrided, followed by hardening and tempering to satisfy a relationship of: C%<0.13 (Cr%+V%)+1.10 and to satisfy that carbides existing on a surface of the member have an area fraction of 15 to 50%, where C% is a surface carbon concentration and Cr%+V% is concentrations of Cr and V.

BRIEF DESCRIPTION OF THE DRAWINGS

In the accompanying drawings:

FIG. 3 is a graph showing the relationship between wear rates and carbide's area fraction, compared with test specimens of inventive, comparative and conventional examples;

DETAILED DESCRIPTION OF THE PREFERRED EMBODIMENTS

Figure 1:
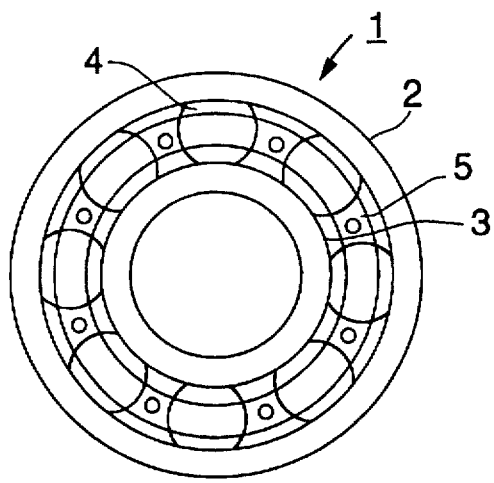
FIG. 1 is a front view of an embodiment of the rolling bearing of the present invention.

Description will be given below in detail of an embodiment of a rolling bearing according to the present invention with reference to the accompanying drawings.

It is conventionally known to improve the wear resistance of bearing materials by adding large amounts of carbide-forming elements such as Cr, Mo and V so that carbides existing in the bearing's surface layer are precipitated in large quantities. This method is based on the idea of providing better wear resistance by increasing the amount of carbides to such an extent that the service life is not adversely affected. On the other hand, the present inventors aim at the carbide structure and the amount of carbides existing in the bearing's surface layer and studied the relationships between the carbide structure and the amount of carbides existing in the bearing's surface layer, and between the service life and the wear resistance of bearings. As a result, the inventors found out that the addition of V to have VC-type carbides precipitated was extremely effective in improving the wear resistance of bearings.

Further, the inventors found out that when the concentrations of Cr and V satisfied a specified relationship with the concentration of C, extremely fine-grained and hard VC-type carbides were precipitated while preventing coarse and brittle $M_3C$-type carbides from precipitating. In addition, by limiting the area fraction of carbides to be within a specified range, a rolling bearing could be produced that had not only superior wear resistance but also an extending service life. The present invention has been accomplished on the basis of these findings.

There various functions of the elements contained in the rolling bearing of the present invention, as well as the criticality of the content of each element, are described below.

C: 0.2 to 1.0 wt %

Carbon is the essential element for forming carbides and transforming the base metal to martensite to increase the hardness after hardening and tempering.

The carbon content is set to at least 0.2 wt % in order to prevent reticulate coarse carbides from precipitating at grain boundaries as a mixed structure of an austenitic phase and unsolved carbides during carburizing or carbonitriding. The upper limit of the carbon content is set to 1.0 wt % because the toughness of the core of the bearing is deteriorated if carbon is contained in amounts greater than 1.0 wt %.

Cr: 3.0 to 14.0 wt %

Chromium improves hardenability and functions to strengthen the base metal. Additionally, if Cr is added in a large amount, the carbides produced by carburizing or carbonitriding are transformed to $M_7C_3$ type having such a property as to make the carbides hard and slow in grain growth to prevent them from becoming coarse, so that the addition of Cr contributes to the improvement of the rolling fatigue strength.

The lower limit of the chromium content is set to 3.0 wt % in order to strengthen the base metal while securing to prevent coarse $M_3C$-type carbides from being produced. The upper limit of the chromium content is set to 14.0 wt % because if the upper limit is exceeded, macro carbides are produced in a stage of raw materials and stress concentration occurs around the carbides to deteriorate the service life.

V: 0.8 to 3.0 wt %

Vanadium is an element which is effective to increase the resisting property for temper softening and to produce extremely fine-grained and hard VC carbides, so that the addition of V contributes to the improvement of wear resistance and life property.

The lower limit of the vanadium content is set to 0.8 wt % because the addition effect of vanadium is not sufficiently exhibited if it is added in less than 0.8 wt %. The upper limit of the vanadium content is set to 3.0 wt % because the excess addition of vanadium not only deteriorates grindability but also increases in cost.

Mo: $\leq 3.0$ wt %

Molybdenum is a selective element which is effective to increase the resisting property for temper softening, similarly to vanadium. The addition of Mo, which is similar to chromium, also serves to improve the rolling fatigue strength by preventing the coarse-graining of carbides which are precipitated as the result of carburizing or carbonitriding.

The upper limit of the Mo content is set to 3.0 wt % because excess addition of Mo not only deteriorates the plastic workability but also becomes higher in cost.

$C\% \leq 0.13 \, (Cr\% + V\%) + 1.10$

The surface carbon concentration attained by carburizing or carbonitriding satisfies the following relation with the concentrations of Cr and V:

$$C\% \leq 0.13 \, (Cr\% + V\%) + 1.10$$

and the area fraction of the carbides is set to a range of 15 to 50%.

If the surface carbon concentration satisfies the relation of $C\% \leq 0.13(Cr\% + V\%) + 1.10$, extremely fine-grained and hard VC-type carbides are precipitated, so that the precipitation strengthening achieves a remarkable improvement in wear resistance. In contrast, if the surface carbon concentration indicates the relation of $C\% > 0.13(Cr\% + V\%) + 1.10$, the coarse and brittle $M_3C$-type carbides are precipitated, so that the improvement in wear resistance becomes insufficient.

If the area fraction of the carbides exceeds 15%, the improvement in wear resistance is remarkable. However, if the area fraction of the carbides exceeds 50%, the raw materials containing the carbides are extremely deteriorated in mechanical strength.

EXAMPLE

Examples of the present invention will now be described with reference to the accompanying drawings.

FIG. 1 is a front view of an embodiment of the rolling bearing 1 of the present invention. The rolling bearing 1 includes an outer race 2, an inner race 3, rolling elements 4 and a cage 5.

Various alloy compositions of raw materials used for the rolling bearing 1 are indicated in Table 1.

TABLE 1

| No. | C | Cr | V | Mo | Remarks |
|---|---|---|---|---|---|
| 1 | 0.3 | 3.2 | 1.4 | — | Invention |
| 2 | 0.4 | 7.8 | 1.5 | — | Invention |
| 3 | 0.4 | 13.8 | 1.5 | — | Invention |
| 4 | 0.7 | 5.1 | 0.9 | — | Invention |
| 5 | 0.8 | 5.3 | 2.6 | — | Invention |
| 6 | 0.8 | 5.0 | 2.3 | 2.4 | Invention |
| 7 | 0.5 | 5.3 | 0.5 | — | Comparison |
| 8 | 0.5 | 1.8 | 2.1 | — | Comparison |
| 9 | 1.0 | 1.5 | — | — | Convention |
| 10 | 0.2 | 1.0 | — | — | Convention |

Alloy composition Nos. 1 to 6 are alloy steels according to the present invention. Alloy composition No. 7 is an alloy steel not within the scope of the present invention in terms of the V content. Alloy composition No. 8 is an alloy steel not within the scope of the present invention in terms of the Cr content. Alloy composition No. 9 (JIS SUJ 2) and No. 10 (JIS SCR 420) are alloy steels that free of vanadium and also out of the scope of the present invention in terms of the Cr contents.

Comparative tests for confirming the effect of the present invention were conducted as shown in Table 2. Test Specimens A to P were formed of the respective alloy steels having the compositions shown in Table 1 to be employed in each tests as described hereinafter. The thus prepared test specimens were subjected to heat treatments such as carburizing, hardening and the like. The heat treatments were performed under the following conditions.

Test Specimens A to F according to the present invention and Test Specimens G to N serving as comparative examples were subjected to the carburizing which was performed in a carburizing gas atmosphere at 920° to 950° C. for 4 to 8 hours, followed by hardening and subsequently tempering at 180° C. for 2 hours. Further, in the case where the carbonitriding was performed, a carbonitriding temperature was set to 840° to 870° C. and ammonia gas 3 to 5% was added in the carburizing gas atmosphere. The other carbonitriding conditions were similar to the carburizing and hardening treatment.

Test Specimen O formed of steel species SUJ 2 was subjected to the hardening at 840° C., followed by tempering at 180° C. for 2 hours.

Test Specimen P formed of steel species SCR 420 was subjected to the carburizing at 930° C. for 4 hours, followed by secondary hardening at 860° C. and tempering at 180° C. for 2 hours.

The test specimens subjected by the necessary heat treatment were evaluated for heat treatments quality (in terms of the surface carbon concentration and the area fraction of carbides). In addition, they were subjected to wear tests and life tests. The results were then compared.

The term "surface carbon concentration" as used herein means the average carbon concentration (wt %) in a range from a surface serving as an rolling surface to a depth which is equivalent to 2% of the diameter of the rolling elements. The term "the area fraction of carbides" indicates the proportion measured in the surface.

Figure 2A:
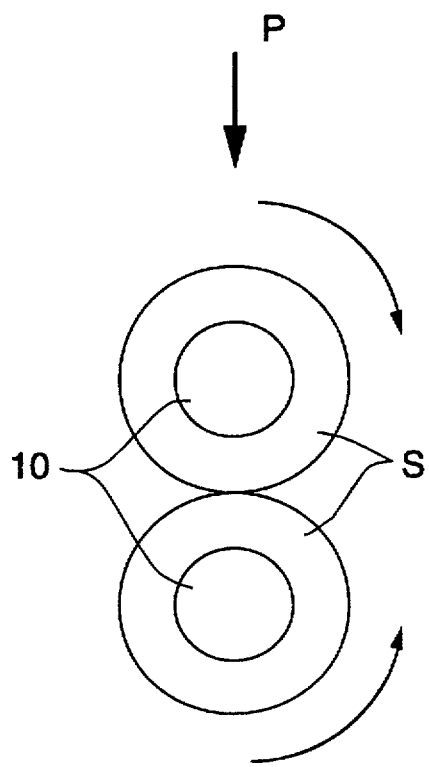
FIG. 2A is a front view for illustrating a two-cylinder wear tester.
Figure 2B:
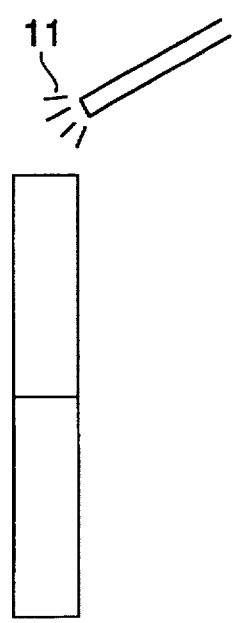
FIG. 2B is a side view thereof.

The wear tests were conducted with a two-cylinder wear tester as shown in FIGS. 2A and 2B. Test specimens S were mounted on a pair of cylinders 10 vertically opposing to each other, which were held in mutual contact and rotated contrary at low speed under a load P that applies from above of the wear tester. The wear rates (mg/m) relative to both specimens S were measured to obtain the average value. In order to test for wear resistance under insufficient lubrication, the rotating specimens were supplied with a lubricant 11 which was so low in viscosity that an oil film was easy to break.

The specific conditions for the wear test were as follows.

| Load | 100 kgf |
|---|---|
| Contact pressure | 100 kgf/mm² |
| Rotational speed | 10 rpm |
| Slip ratio | 30% |
| Lubricant | #10 spindle oil |
| Oil temperature | 60° C. |

The life test was conducted with a thrust rolling life tester under lubrication in the presence of foreign matter. The thrust rolling life tester is disclosed in "Guide for Special Steel (1st ed.)" edited by the Institute of Electric Steel, RIKO-GAKUSHA, 1965, chap.10, p.21.

The specific conditions for the life test were as follows:

| Load | 655 kgf |
|---|---|
| Contact pressure | 500 kgf/mm² |
| Rotational speed | 1,000 rpm |
| Lubricant | #68 turbine oil |
| Foreign matter | Steel powder (SUS 420 J2); hardness $H_RC$ 52; particle size, 80 to 160 μm |
| Concentration of foreign matter | 300 ppm |

The results of the wear and life test are shown in Table 2. The wear rates (mg/m) shown in Table 2 were obtained by using the two-cylinder wear tester with two-cylinder test specimens having dimensions of 30 mm in outer diameter, 16 mm in inner diameter, and 7 mm in width, in addition, the balls (outer diameter of ⅜ inch) which were used in the above-described thrust rolling life test as the rolling elements. The wear rates (mg/m) were obtained in the surface carbon concentration (wt %) providing the two-cylinder test specimens with the average carbon concentration in a range from a surface to a depth which was equivalent to 2% of the outer diameter of the ball.

TABLE 2

| Test Specimen | Alloy | Surface carbon concentration (wt %) | Area fraction of carbides (%) | Heat treatment | Wear rate (mg/m) | $L_{10}$ life (×10⁶ cycles) | Remarks |
|---|---|---|---|---|---|---|---|
| A | 1 | 1.5 | 20 | carburizing and hardening | 0.18 | 17.8 | Invention |
| B | 2 | 1.8 | 32 | carburizing and hardening | 0.17 | 20.2 | Invention |
| C | 3 | 2.9 | 42 | carburizing and hardening | 0.16 | 21.1 | Invention |
| D | 4 | 1.6 | 27 | carburizing and hardening | 0.19 | 16.4 | Invention |
| E | 5 | 2.0 | 31 | carburizing and hardening | 0.12 | 18.9 | Invention |
| F | 6 | 1.9 | 30 | carburizing and hardening | 0.13 | 23.2 | Invention |
| G | 1 | 1.9 | 28 | carburizing and hardening | 0.33 | 11.2 | Comparison |
| H | 3 | 3.3 | 48 | carburizing and hardening | 0.32 | 12.4 | Comparison |
| I | 4 | 2.2 | 39 | carburizing and hardening | 0.31 | 11.0 | Comparison |
| J | 5 | 2.7 | 44 | carburizing and hardening | 0.28 | 8.7 | Comparison |
| K | 4 | 0.9 | 9 | carburizing and hardening | 0.36 | 7.2 | Comparison |
| L | 5 | 1.0 | 10 | carburizing and hardening | 0.31 | 9.1 | Comparison |
| M | 7 | 1.6 | 25 | carburizing and hardening | 0.24 | 15.2 | Comparison |
| N | 8 | 1.3 | 23 | carburizing and hardening | 0.18 | 10.8 | Comparison |
| O | 9 | 1.0 | 8 | through hardening | 0.42 | 2.1 | Convention |

TABLE 2-continued

| Test Specimen | Alloy | Surface carbon concentration (wt %) | Area fraction of carbides (%) | Heat treatment | Wear rate (mg/m) | $L_{10}$ life (×10$^6$ cycles) | Remarks |
|---|---|---|---|---|---|---|---|
| P | 10 | 0.9 | 4 | carburizing and hardening | 0.43 | 6.5 | Convention |

As is apparent from Table 2, Test Specimens A to E according to the present invention had at least twice the wear resistance and service life of Test Specimens O and P i.e., the conventional examples. Test Specimen F, which additionally had 2.4 wt % Mo, has a longer life than Test Specimens A to E.

Test Specimens G to J were comparative examples having excessively high concentrations of C. Since they had coarse and brittle $M_3C$-type carbides precipitated on the surface, the improvement in wear resistance therein was not sufficient. Test Specimens K and L were comparative examples having excessively small carbide contents. Also, the improvement in wear resistance was not sufficient.

Test Specimen M had vanadium V added in an amount less than the lower limit specified by the present invention. Evidently, the improvement in wear resistance was not sufficient. Test Specimen N had chromium Cr added in an amount less than the lower limit specified by the present invention. Evidently, the improvement of service life property was not sufficient in this example.

FIG. 3 shows the relationship between the area fraction of carbides and the wear rate. When the area fraction of carbides exceeded 15%, the improvement in wear resistance was remarkable. As is also apparent from FIG. 3, the wear resistance was extremely superior when the relation of 0% ≦ 0.13(Cr%+V%)+1.10 was satisfied.

Figure 4:
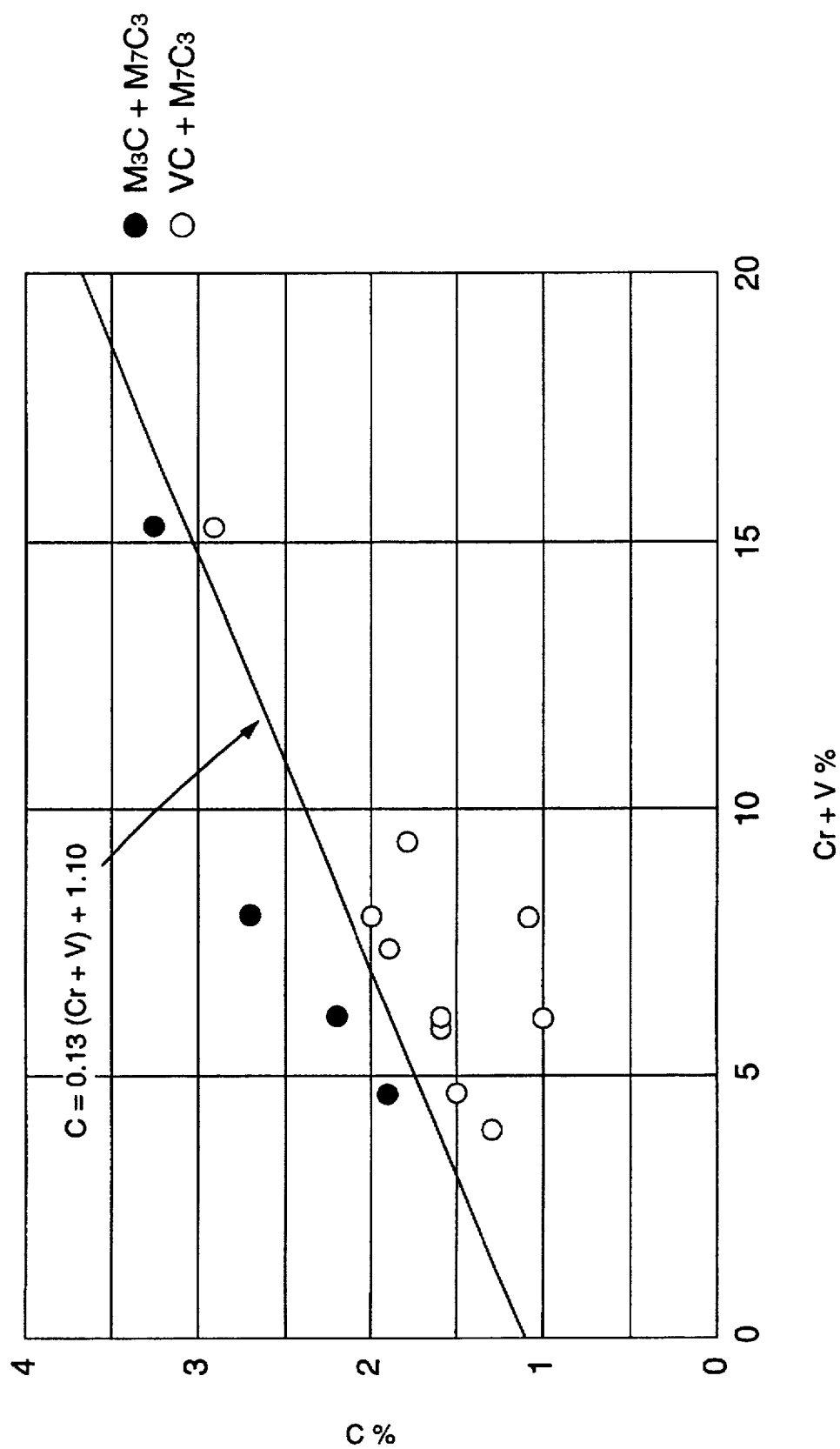
FIG. 4 is a graph showing the relationship between concentrations of C and Cr+V relative to the carbide structure in the test specimens.

FIG. 4 shows the relationship between the concentrations of Cr+V and C existing in the surface layer, relative to the carbide structure. The area under the straight line expressed by C=0.13(Cr+V)+1.10 refers to the range of examples according to the present invention. The area above the straight line refers to the range of comparative examples.

Additionally, in order to check the mechanical strength of Alloy Composition Nos. 1 and 5, ring-shaped test pieces (inner diameter 13 mm; outer diameter 20 mm; width, 8 mm) were made of those compositions and subjected to crushing tests. The thus prepared test pieces were carburized at 920° to 950° C. for 4 to 8 hours, followed by hardening and tempering at 180° C. for 2 hours, and grinding to the specified dimensions. The test pieces had varying area fractions of carbides on the surface to conduct the crushing tests.

Figure 5:
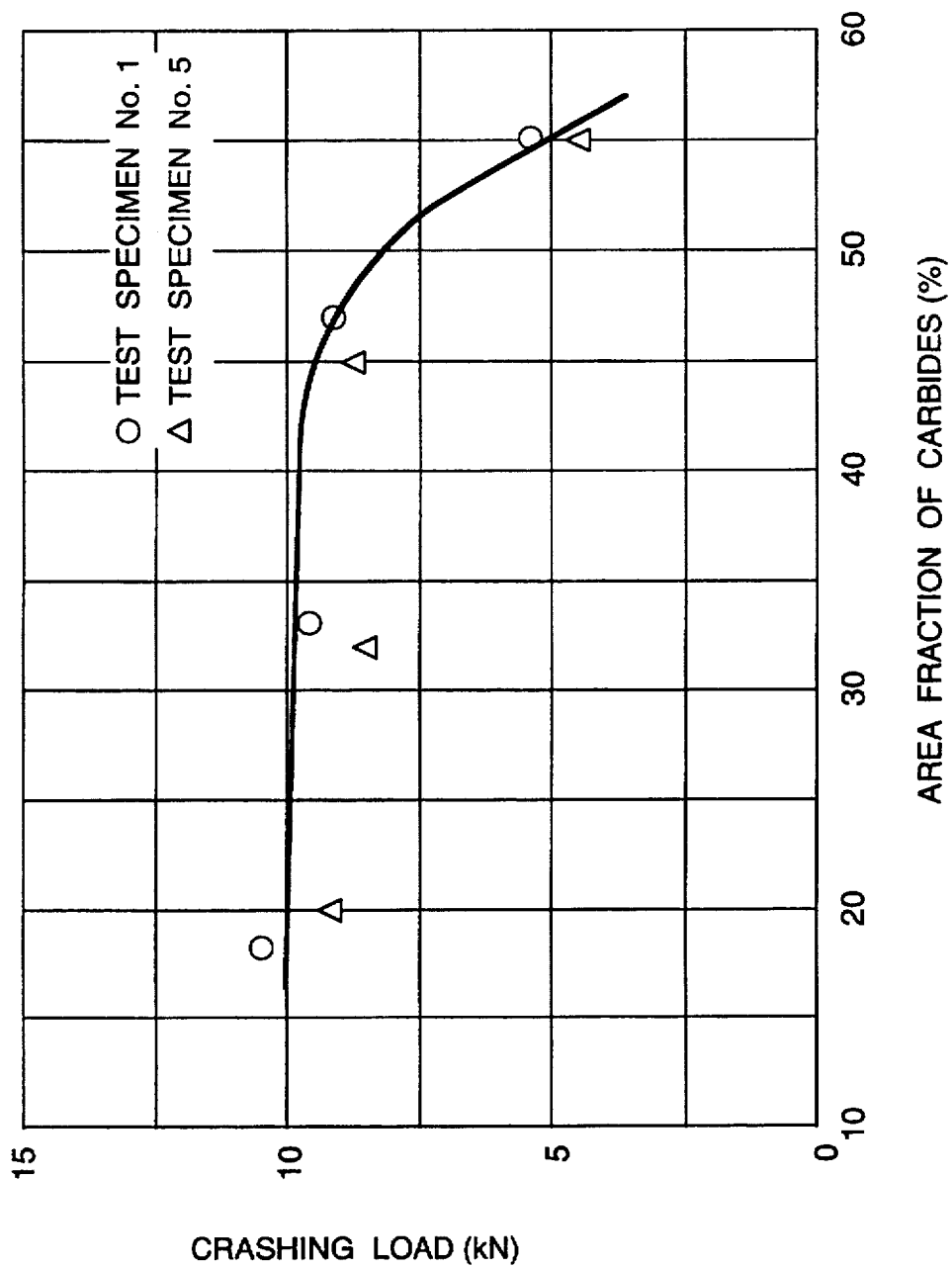
FIG. 5 is a graph showing the relationship between the carbide's area fraction and crushing loads in crushing tests.

The crushing tests were conducted at a ram speed of 0.5 mm/min, using an autograph made by Shimadzu Corp. The test results are shown in FIG. 5. Evidently, the crushing load abruptly deteriorated when the area fraction of carbides exceeded 50%.

The above-described examples refer to the case where the present invention is applied to the inner race of a rolling bearing. The present invention is applicable, either individually or wholly, to the other components of a rolling bearing such as the outer race and rolling elements. In the case where the present invention is applied to the rolling elements, the surface carbon concentration is defined by the average carbon concentration (wt %) in a range from a surface of the rolling element to a depth which is equivalent to 2% of the diameter of the rolling element.

As for the heat treatment, the present invention is also applicable to the rolling bearing subjected to carbonitriding as well as carburizing.

As described above, the rolling bearing of the present invention is characterized in that at least one of the inner race, outer race and rolling elements is made of an alloy steel containing 0.2 to 1.0 wt % of C, 3.0 to 14.0 wt % of Cr and 0.8 to 3.0 wt % of V, with the balance being Fe and other alloy elements, the alloy steel being carburized or carbonitrided and subsequently hardened and tempered to secure that the surface carbon concentration and the concentrations of Cr and V satisfy the following relation:

$$C\% \leq 0.13 (Cr\%+V\%)+1.10$$

and that the carbides have an area fraction of 15 to 50%.

Because of these essential features, extremely fine-grained and hard VC-type carbides are precipitated in the steel structure while coarse and brittle $M_3C$-type carbides are prevented from precipitating; thus, the rolling load concentrating at the edges of indentations which form on the respective surfaces of the inner and outer races and the rolling elements in a rolling bearing as the result of repeated contact with the foreign matter in a lubricant is effectively mitigated to prevent the occurrence of microcracks and achieve a remarkable improvement in the wear resistance of the bearing. Hence, the rolling bearing of the present invention is long-lived even if it is used under lubrication in the presence of foreign matter and, additionally, it features superior wear resistance.

What is claimed is:

1. In a rolling bearing comprising an inner race, an outer race and a plurality of rolling elements, the improvement wherein at least one member of the inner race, the outer race and the rolling elements is made of an alloy steel comprising:
0.2 to 1.0 wt % of C;
3.0 to 14.0 wt % of Cr;
0.8 to 3.0 wt % of V;
at most 3.0 wt % of Mo; and
the balance being Fe, the member satisfying a relationship of:

$$C\% \leq 0.13 (Cr\%+V\%)+1.10$$

and having carbides existing on a surface of the member have an area fraction of 15 to 50% after a surface layer thereof is carburized or carbonitrided and then hardened or tempered, where C% is a surface carbon concentration and Cr% and V% are concentrations of Cr and V respectively.

2. In a rolling bearing comprising an inner race, an outer race and a plurality of rolling elements,
the improvement wherein at least one member of the inner race, the outer race and the rolling elements is made of an alloy steel comprising:
0.2 to 1.0 wt % of C;
3.0 to 14.0 wt % of Cr;
0.8 to 3.0 wt % of V;
at most 3.0 wt % of Mo; and
the balance being Fe;
the member satisfying a relationship of:

$$C\% \leq 0.13 (Cr\% + V\%) + 1.10$$

where C% is a surface carbon concentration and Cr% and V% are concentrations of Cr and V, respectively.

* * * * *